March 3, 1964 W. R. POSTLEWAITE 3,123,232
PALLET LOAD TRANSFER MECHANISM
Filed Jan. 2, 1963 4 Sheets-Sheet 2
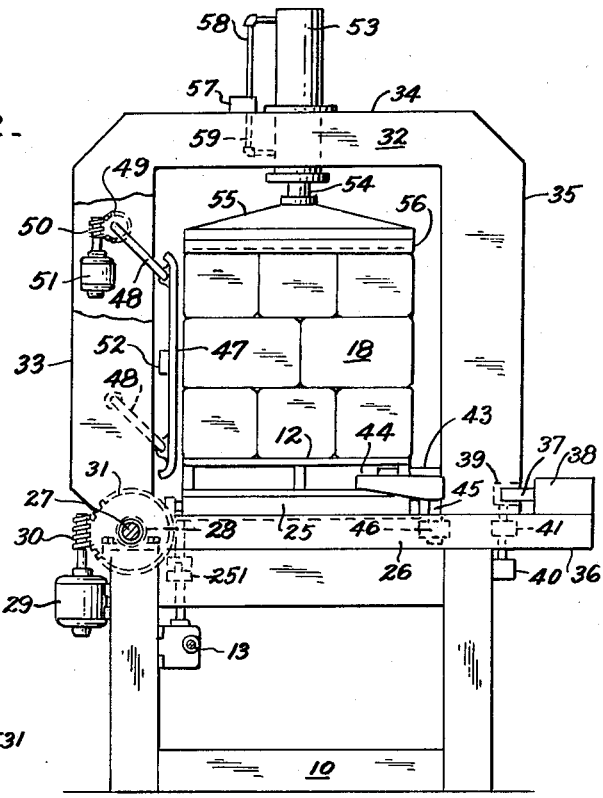
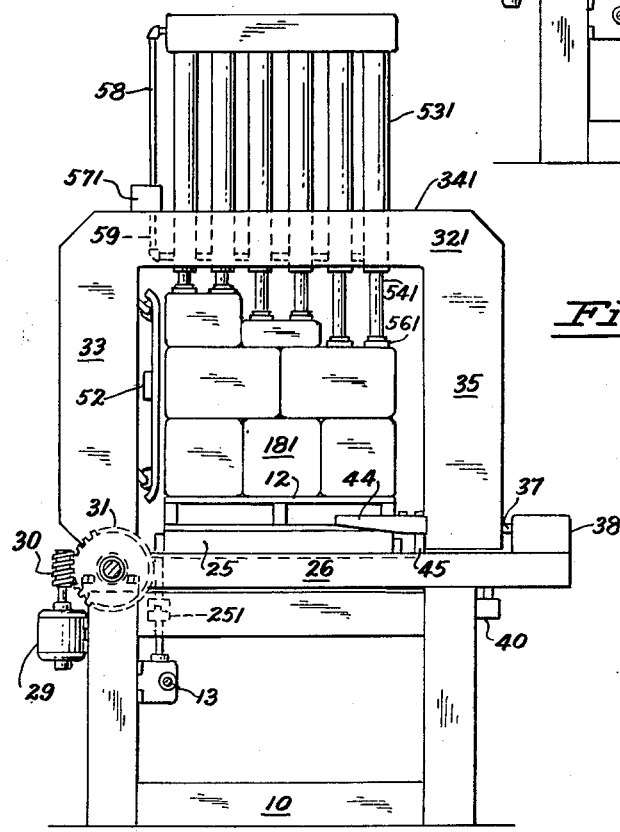
INVENTOR
WILLIAM R. POSTLEWAITE
BY
ATTORNEYS

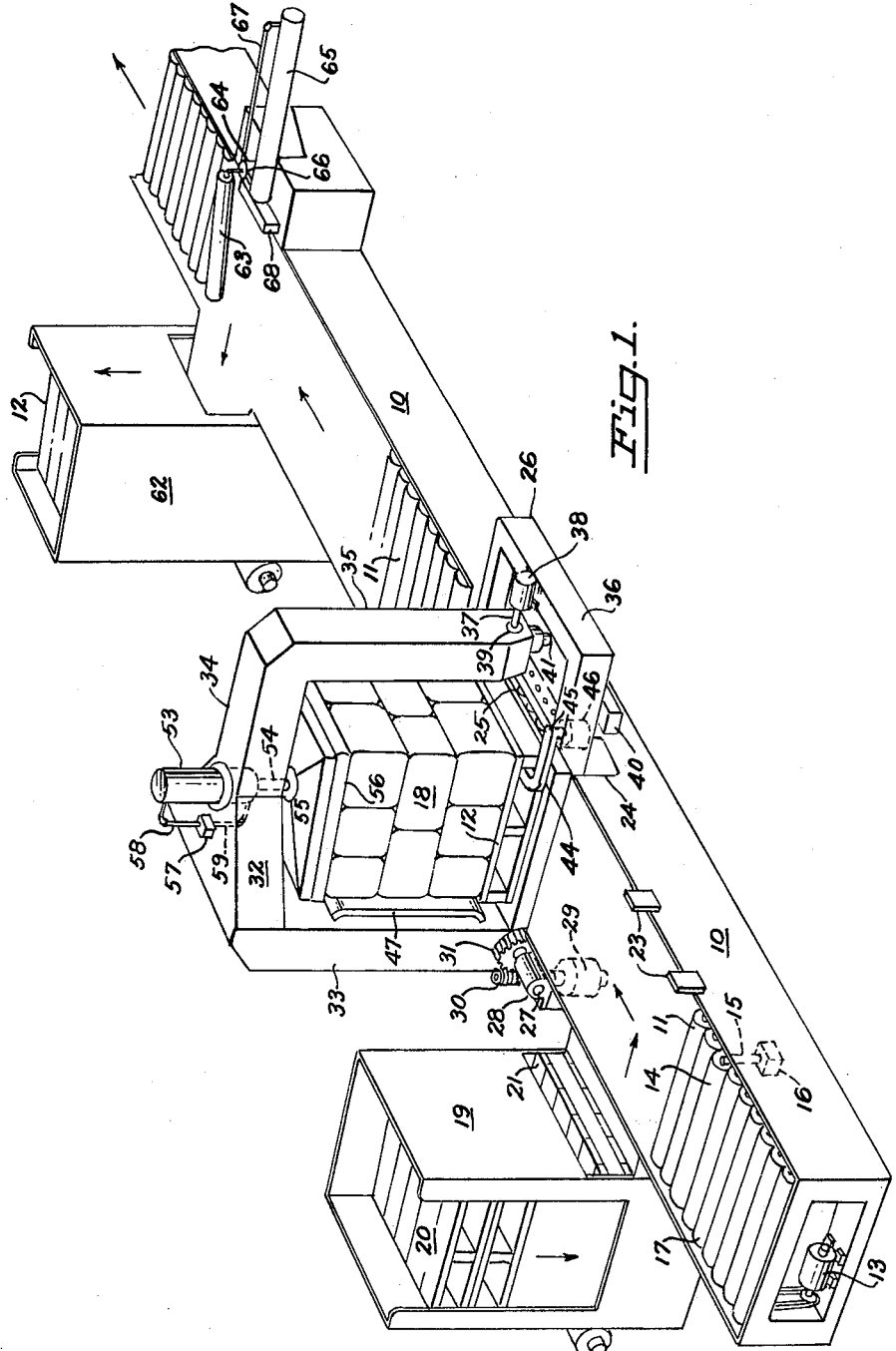

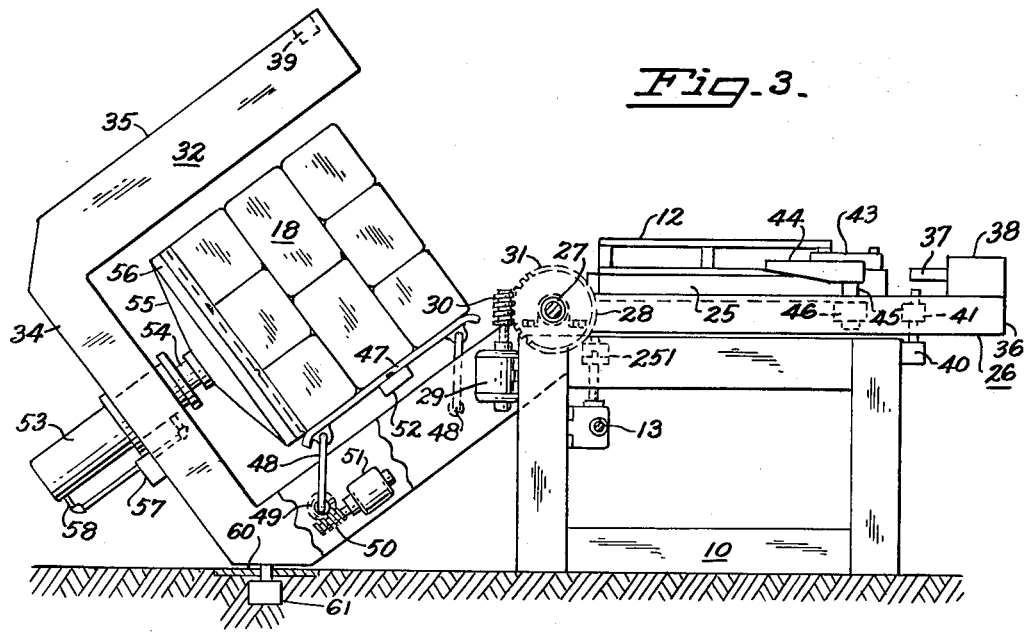
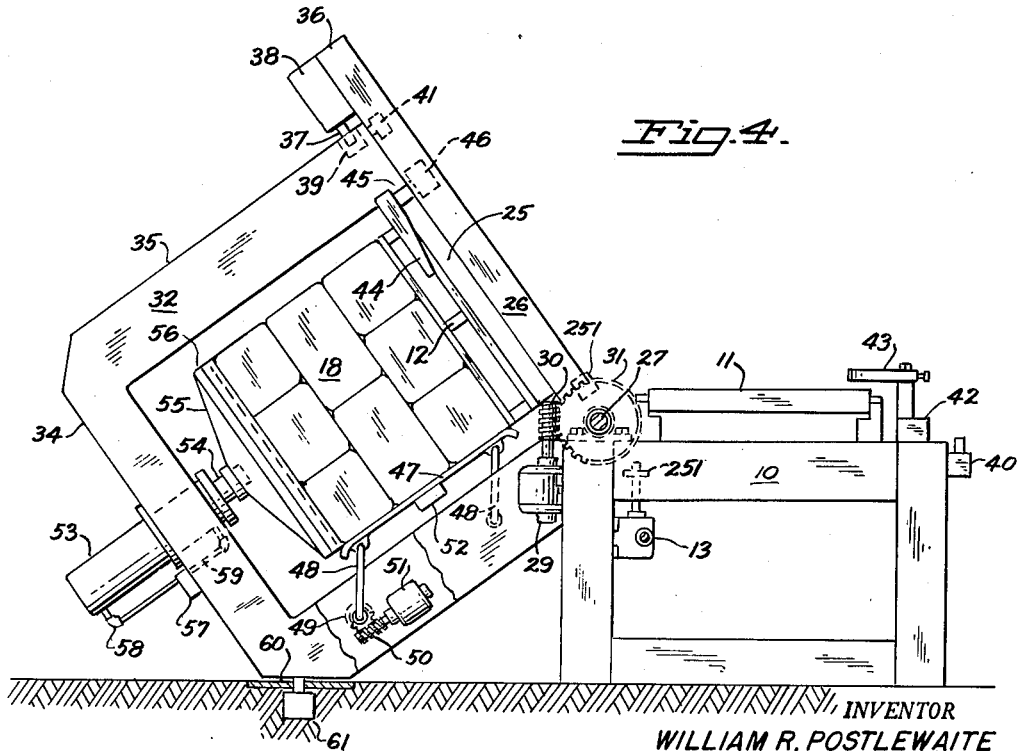

United States Patent Office 3,123,232
Patented Mar. 3, 1964

3,123,232
PALLET LOAD TRANSFER MECHANISM
William R. Postlewaite, Menlo Park, Calif., assignor to California Research Corporation, San Francisco, Calif., a corporation of Delaware
Filed Jan. 2, 1963, Ser. No. 249,032
9 Claims. (Cl. 214—6)

This invention relates to material handling apparatus and particularly refers to a system for receiving a succession of loaded first pallets from a source such as a conveyor, transferring the individual loads thereon to second empty pallets and successively returning the loaded second pallets to a further section of the conveyor.

In certain material manufacturing and storage systems, the pallets on which the materials are initially stacked may be of different materials, types or ownerships than those on which they are to be shipped, so that it is necessary to transfer the loads from one set to the other. Under some circumstances this can be done by suitable fork lift trucks and the like, but there are occasions when this is not economical or feasible.

This invention is characterized broadly by the provision of apparatus placed at an intermediate point or at the end of a conveyor system to receive an individual loaded first pallet and tilt it sideways through a predetermined angle, greater than 90° and generally somewhat less than 180°, while supporting the top and lower side of the load and holding it clamped securely against the pallet to prevent relative displacement of any units of the load, until the tilting is complete and the first pallet may be removed, then replacing that pallet with a second empty pallet, clamping the load to the second pallet, and tilting them back as a unit into the original upright position onto the conveyor. This may be controlled manually, or completely automatically by suitable means initially responsive to the position of the first loaded pallet with regard to the clamping, supporting, tilting and associated mechanisms, as will be described in detail below.

Among the objects of the invention are:

(1) To provide an improved material handling apparatus for a succession of loaded pallets to transfer their loads to a second succession of empty pallets, without requiring unloading or manual handling of the pallets or the loads thereon.

(2) To provide a simple form of load tilting equipment by means of which a second pallet can be substituted for one on which the load initially rested.

(3) To provide an improved load transfer apparatus that may be entirely automatically controlled by the loaded pallets being handled.

(4) To provide an improved load transfer apparatus that will accommodate pallets with loads of varying and irregular height relative to the plane of the pallet.

(5) To provide an improved pallet load tilting apparatus that will support the load while this occurs so that there will not be relative movement between the several discrete parts constituting the load.

(6) To provide a load transferring apparatus which is adaptable to complete or partial automatic operation.

These and other objects and advantages will be further apparent from the following description of a preferred embodiment of the invention, together with certain modifications of some of its parts, taken in conjunction with the attached drawings, which form a part of this specification.

In the drawings,

FIG. 1 is a perspective view of a material handling conveyor for loaded pallets to which this invention has been applied to transfer loads from a first set of pallets to a second set of pallets.

FIG. 2 is a vertical and part transverse sectional view of a preferred form of the tilting and load clamping means of the arrangement of FIG. 1, with a loaded pallet in place therein.

FIG. 3 is a vertical and part transverse sectional view similar to FIG. 1 with the load tilted and the first pallet returned empty to the conveyor.

FIG. 4 is a vertical and part sectional view similar to FIG. 3 with the second pallet clamped to the load and ready to be tilted back to the plane of the conveyor, as shown in FIG. 1.

FIG. 5 is a detailed vertical and part sectional view of a portion of an alternative arrangement of top load retaining means to accommodate irregular stacks of load units on a pallet.

Figure 6:
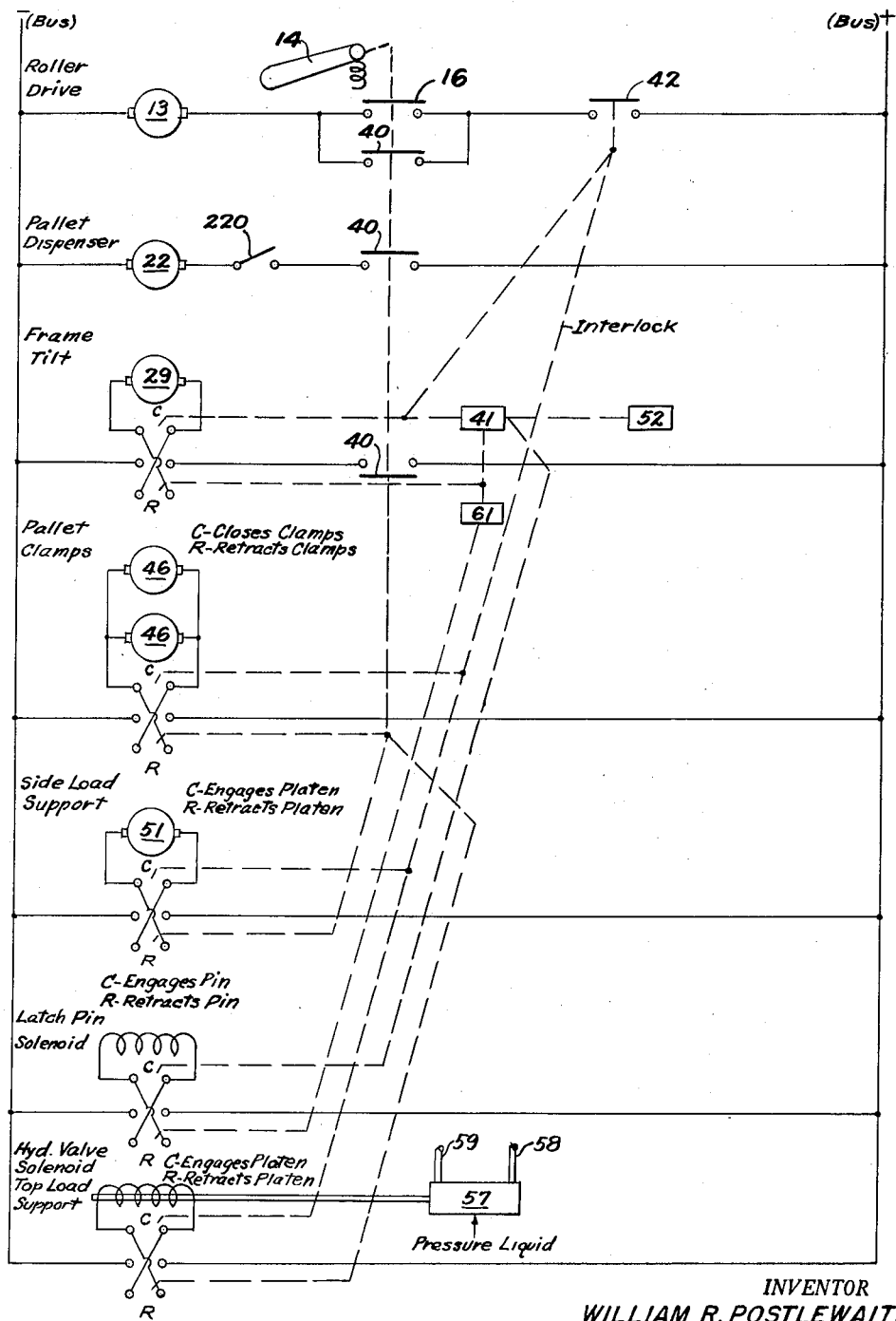
FIG. 6 is a schematic diagram of a typical electrical and hydraulic control and actuating system for the several components of the arrangements of FIGS. 1-4, inclusive.

Referring to FIG. 1, which shows in perspective a complete assembly illustratively embodying the invention, reference numeral 10 designates an elongated metal base on the upper surface of which are conveyor means, for example, a bed of parallel rollers 11, adapted to receive at its left end a succession of loaded first pallets 12 from any suitable source, e.g., fork lift trucks or the like (not shown). If the pallets 12 are to be manually advanced, rollers 11 may all be free to turn. If the system is to be automatic, as is preferred, a suitable motor-driven means generally designated 13 is provided in base 10. Desirably, the motor is of the self-braking type that will give a controlled and gradual deceleration for the rollers, to limit the travel of pallet 12 after the motor is de-energized.

One roller 14 in frame 10 is mounted in a hinged bearing at one end, and the other end bearing is urged upwardly by means of a resilient linkage 15 connected to a cycle-initiating single-throw switch 16 for motor 13. By this means, an advancing pallet 12 on free rollers 17 will depress roller 14 to close switch 16 and start the driven rollers 11 to advance the pallet 12 and its load 18 into the tilting mechanism to be described below. Alternatively, a fork lift truck (not shown) could initiate this cycle by depositing the pallet 12 on top of roller 14 to depress it.

At one side of conveyor frame 10 is located a pallet dispenser 19, of the conventional type, adapted to hold a stack of second empty pallets 20 which are controllably ejected one at a time through aperture 21 onto rollers 11 by means of a motor 22 and a suitable internal ram. A rotation responsive switch 220 stops motor 22 after a predetermined time interval, to enable pallet 20 to clear the dispenser. Stops 23 on the opposite side of bed 10 from dispenser 19 align the incoming empty second pallet 20 with the roller bed. The purpose and function of dispenser 19 will be discussed in more detail below.

Intermediate the length of conveyor roller bed 11 there is a space to receive a group of driven rollers 25 mounted in a rectangular frame 26 extending transversely across the bed. The drive means for these rollers is desirably energized from the same motor-driven system 13 already mentioned, and which is responsive to a pallet position-actuated switch on frame 26, which will be described in detail below. Thus, when the frame is in its horizontal position across bed 11 as shown in FIGS. 1 and 2, the rollers 25 in the frame will be under the direction of roller drive 13 and its associated control means, but will be inert or can even be locked against rotation, if desired, when the frame is titlted as in FIGS. 3 and 4, or when it is in any intermediate position. To this end, a conventional separable coupling 251 is provided in the drive means which connect rollers 25 to the drive system 13 for rollers 11.

One end of the frame 26 is secured to a horizontal shaft 27 mounted in bearings 28 at one side of base 10. The shaft 27 and the top of side members of frame 26 are slightly below the plane of the top of main rollers 11. A reversing type motor 29 on base 10 drives a worm 30 engaging a worm gear 31 secured to frame 26 to rotate it counterclockwise from the position shown in FIG. 1 through about 120° to 200°, to the position shown in FIG. 4, where it is tilted back and away from the main roller bed 11 so that none of the weight of load 18 rests on first pallet 12. When reversed, the motor 29 functions to return the load and a new pallet to its original position.

Also journalled coaxially for rotation on shaft 27 is a C-shaped load-encircling means generally designated 32, having a portion 34 extending transversely across the load 18 and pallet 12, and a downwardly extending portion 35 terminating adjacent to the outer end portion 36 of frame 26. Selectively acting coupling means are provided to secure load-encircling means 32 to frame 26, in this example constituting an extensible and retractible latch pin 37 carried by a solenoid 38 on end portion 36 and adapted to engage a suitable recess 39 near the lower end of 35. A first double-throw limit switch 40 is mounted on base 10 to be engaged by a side member of frame 26 when the latter is in its lowermost position to energize solenoid 38 in the desired direction. Additionally, a second double-throw limit switch 41 is mounted on end 36 of the frame 26 to be engaged by the tip of 35 when it contacts frame 26 and is thus in position to be secured thereto by latch pin 37.

A third single-throw limit switch 42 is placed on frame 26 at the far side from that over which the loaded pallets 12 enter it, and has an adjustable swinging transverse arm 43 which extends partially across bed 11 where it may be engaged by the leading face of any pallet when the latter is aligned with the side members of frame 26 and with the center of the load-encircling means 32 (FIG. 4). This latter switch 42 is interlocked with switch 16 already described and acts to stop motor 13 and hence the driven rollers 25 on which the pallet rests. Thus, an entering pallet, with or without a load, is stopped in alignment with frame 26 to be tilted thereby.

On each side member of frame 26, and outside of the path of the pallets is mounted a horizontally rotatable, tapered, pallet-clamping arm 44 supported in vertical bearing 45 and driven by a reversing type torque motor 46. These arms may be rotated inwardly in an arc selectively to clamp the lower floor board of a pallet to rollers 25 of frame 26, or rotated outwardly to release the pallet from the frame and clear the way for subsequent entry of pallets thereon, or departure therefrom. Switch 42, under certain conditions of operation, also acts to control both motors 46, as will be described in more detail below.

To prevent the load 18 from shifting sideways relative to its supporting pallet 12 while they are tilted together to the position shown in FIGS. 3 and 4, a vertical, load-engaging platen 47 is supported by parallel sets of links 48 secured to the inside face of vertical portion 33 of means 32. One or more of these links are connected by a worm gear 49 and worm 50 to a reversing motor 51 on member 33 (FIG. 2), so that the platen 47 may be moved inwardly against the side of load 18 when it is in its initial vertical position, and will support the side of the load 18 throughout the tilting operation. First limit switch 40, among other functions, controls motor 51 to initiate the last-named operation. A fourth single throw limit switch 52, carried by platen 47, is actuated by its contact with load 18 to stop motor 51 when the event occurs.

In the center of transverse member 34 of means 32 there is supported a vertical hydraulic cylinder 53 from which ram 54 extends downwardly to a top load-engaging platen 55, having a resilient pad 56 of foam rubber or the like on its lower face. Among other functions of the pallet-position responsive third limit switch 42 on frame 26, it acts to control a magnetic two-position hydraulic valve 57 to admit liquid under pressure selectively to the upper and lower ends of cylinder 53 through lines 58 and 59, respectively. Any suitable source of pressure fluid, e.g., a domestic water supply system (not shown) may be used, and the area of ram 54 is chosen to limit the total force exerted on platen 55 and load 18, so as not to damage the latter. When the load is clamped by the combined action of these switches, motor 29 is actuated to tilt the load to the position of FIG. 4.

It will be noted that the two load-engaging platens 47 and 55 cooperate during the tilting operation to hold the load 18 without permitting it to shift relative to a first pallet 12, or, as will be explained later, relative to a second pallet 20.

At the side of base 10 (FIG. 3), and adapted to receive an upper corner of load-encircling means 32 in its tilted position, is located a support pad 60, with a fifth single-throw limit switch 61, which acts independently of the first limit switch 40 to withdraw the latch pin 37 from its recess 39 in member 35 and also to reverse the tilting motor 29. This causes frame 26 carrying rollers 25 to be rotated clockwise about shaft 27 to return the now empty first pallet 12, still clamped by arms 44 against rollers 25, to the main roller conveyor bed 11 as shown in FIG. 3.

When frame 26, now detached from load-encircling means 32 and load 18, again contacts the second limit switch 41, the latter actuates both motors 46 to withdraw the pallet clamping arms 44, and when this is done, acts to energize motor 13 to drive rollers 11, and to energize motor 22 for a brief time, controlled by switch 220, to eject an empty second pallet 20 from dispenser 19 onto those adjacent rollers. Meanwhile, the empty first pallet 12 is carried by the rollers 25 off of frame 26 onto bed 11 beyond the frame and to a conventional pallet receiver 62 (FIG. 1). At this point, a second hinged roller unit 63 in base 10, similar in construction to roller 14 described above, is deflected downwardly by the now empty pallet 12 to actuate a two-position hydraulic valve 64 to admit fluid pressure to a hydraulic cylinder 65 connected to pressure lines 66 and 67, causing ram 68 to deflect the empty first pallet 12 transversely from rollers 11 into the pallet receiver 62. Valve 64 is of the spring-loaded return type so that it will thereafter automatically retract ram 68 into cylinder 65. Additionally, it is provided with means such as a geneva motion, so that it will fail to respond to the next actuation of the hinged roller 63 by a loaded pallet, for reasons which will be apparent below.

Load 18 is now resting upon platens 47 and 55 as shown in FIG. 3, and when the empty second pallet 20 is driven by rollers 11 onto frame 26, its leading edge will engage the third limit switch 42 on the far side of that frame. This will energize motors 46 to swing together arms 44 to clamp the empty pallet to the rollers 25 in frame 26 and will also energize motor 29 to rotate the frame and pallet counterclockwise from the position of FIG. 3 to the position of FIG. 4. When second limit switch 41 on the frame 26 contacts the end of load-encircling member 35, it will close switch 41 to energize solenoid 38 to extend latch pin 37 into recess 39, thus locking together the frame 26 and load-encircling means 32. This also energizes motor 29 to rotate the unit clockwise from its tilted position to the upright position of FIG. 2, whereupon first limit switch 40 on frame 10 will be contacted by a side member of frame 26, energizing motors 46 to release pallet clamping arms 44 and energizing roller drive motor 13 to advance the load 18, now on second pallet 20, to pass out of the encircling and tilting means on rollers 25. Swinging arm 43 of third limit switch 42 is provided with a geneva motion having two drop-out notches so that it will fail to respond to the passage of the empty first pallet 12 on its way to pallet receiver 62, and also to the loaded pallet 20 just described, but will be responsive to the next incoming loaded pallet 12 to initiate the next sequence of the automatic cycle.

Switch 42 responds to all advancing pallets, loaded or empty and centers them under platen 53 on frame 26. Switch 42 is overrun and swings out of the way when either pallet 12 or 20 passes out of frame 26 to proceed toward the outlet end of the machines.

Referring now to FIG. 5, there is shown an alternative arrangement of a top load-engaging means where the upper surface of the load 181 is irregular in height. In this example, the horizontal portion 341 of load-encircling means 321 is made coextensive with the area of the loaded pallet and is provided with a plurality of transversely and longitudinally spaced hydraulic cylinders 531, each with an individual ram 541 and resilient pad 561 so that all essential upper surfaces of the load are engaged. A single hydraulic valve 571 is connected to control the flow of pressure liquid to each end of all the cylinders, so that each will exert the same force against the upper surfaces of load 181. As in the other example, the valve 571 is of the self-locking type so that once the rams 541 are extended through the desired distance and exert the intended clamping force, the liquid in cylinders 531 is retained until the valve is again actuated to retract their rams from load 181.

Referring now to FIG. 6, there is illustrated schematically the several motors 13, 22, 26, 46 and 51, together with latch pin solenoid 38 and the hydraulic valve 57, as well as switches 16, 40, 41, 42, 52 and 61 with their several interlocks. In this example, for the sake of clearness, the motors and their energy source have been illustrated as designed for direct current, but it is apparent that alternating current could equally well be used with commercially available switching equipment. Also, for the sake of simplicity and brevity, the interlocking means between the several switches have been shown by dotted lines, which will be readily understood by one skilled in this art. The several consecutive and simultaneous functions to be performed by these motors, valves, and control means are set forth in detail above and throughout the description of the example herein, so that there appears to be no need for further repetition in this specification.

In conclusion, it will be appreciated that numerous changes could be made from the illustrative examples in this specification without departing from the invention defined in the accompanying claims. Accordingly, all those modifications which fall within the scope of these claims are intended to be embraced thereby.

I claim:

1. A material handling system for a conveyor on which rests a loaded first pallet, to transfer the load to a second pallet, comprising a conveyor, means extending transversely across said conveyor and adapted disengagably to encircle a loaded first pallet, said means being pivoted at one side of said conveyor, means for tilting said first named means and said loaded first pallet engaged thereby to displace said loaded first pallet from said conveyor, means for freeing said first pallet from the tilted load and returning said first pallet to said conveyor, means for replacing said first pallet on said conveyor with a second pallet, means for engaging the said second pallet with the tilted load, and means including the first said means for returning said second pallet with said load thereon to said conveyor.

2. An automatic material handling system for a conveyor on which rests a loaded first pallet to transfer said load to a second pallet, comprising a conveyor, a first and a second means hinged at one side of said conveyor, said first means extending under a first pallet, said second means extending over a load on said first pallet and adjustably engaging said load, means actuated by said first pallet for tilting as a unit in a vertical plane said first and said second means and said load and said first pallet away from said conveyor at an angle to relieve said first pallet of the weight of said load, means responsive to the tilt of said unit at said angle for returning said first means and said first pallet to said conveyor separately from said second means and said load, means for replacing the returned said first pallet on said first means with a second pallet, means actuated by said second pallet for tilting said first means and said second pallet to engage said second pallet with the tilted said load, and means responsive to the tilted position of said first means and said second pallet for returning as a unit said second pallet and said load to said conveyor.

3. A material handling system for a conveyor on which rests a first loaded pallet to transfer said load to a second pallet, comprising a conveyor, a first means and a second means extending transversely across said conveyor and adapted to disconnectably connect together to encircle a loaded pallet, both of said means being rotatably mounted on one side of said conveyor, means for rotating in a vertical plane said first means and said second means and a loaded pallet encircled thereby to displace said loaded pallet from said conveyor and to dispose said loaded pallet at an angle which will free the load from said pallet, means for supporting said load at said angle, means for returning the free said pallet to said conveyor, means for replacing said pallet on said conveyor with a second pallet, means actuated by said second pallet for engaging said load at said angle with said second pallet, and means including said first means and said second means for returning said second pallet with said load thereon to said conveyor.

4. A material handling system for receiving a succession of loaded first pallets, and transferring said loads to a respective succession of empty second pallets, said system comprising a conveyor, a frame pivotally mounted at one side of said conveyor and extending transversely across said conveyor beneath a single loaded first pallet thereon, means for selectively tilting said frame from the plane of said conveyor and returning it to said plane, load retaining means pivotally mounted coaxially with said frame and extending transversely across said conveyor and said loaded first pallet, a first adjustable means carried by said load retaining means for engaging the top of said load, a second adjustable means carried by said load retaining means for engaging that side of said load adjacent to the pivot axis of said load retaining means, means for selectively connecting said frame to said load retaining means to pivot as a unit with said loaded pallet to a tilted position, means at one side of said conveyor for supporting said load retaining means and said load in the tilted position, means on said frame for releasably clamping a pallet to said frame, means for returning said frame and said first pallet to the plane of said conveyor, means for replacing said first pallet on the returned said frame with an empty second pallet, means for tilting said frame and said second pallet to place said second pallet in contact with the tilted said load, and means including said load retaining means for returning said load and said second pallet to said conveyor.

5. In a material handling system according to claim 4, first and second pallet storage means adjacent said conveyor, and means for releasing an empty second pallet from the said first storage means and for inserting an empty first pallet into the said second storage means by automatic operation of said system.

6. In a material handling system according to claim 4, a motor means for driving said conveyor, and means responsive to the position of a loaded first pallet on said conveyor for stopping said conveyor when said first pallet is aligned with said frame and for actuating automatically said load engaging means and said connecting means and said clamping means and said tilting means and for pivoting as a unit said frame and said load retaining means and said loaded first pallet to the tilted position.

7. A material handling system according to claim 4, in which said first adjustable means carried by said load retaining means comprises a plurality of extensible rams for engaging the top of a load having an irregular top configuration with respect to said pallet.

8. An automatically operated material handling system for receiving a succession of loaded first pallets and transferring the loads therefrom to a respective succession of empty second pallets, said system comprising a conveyor, a frame pivotally mounted at one side of said conveyor and extending transversely across said conveyor beneath a single loaded first pallet thereon, load retaining means pivotally mounted coaxially with said frame and extending transversely across said conveyor and said loaded first pallet, means actuated by said first pallet for detachably connecting the free end of said frame to said load retaining means with said loaded pallet between them, means actuated by said first pallet for tilting as a unit said frame and said load retaining means and said loaded first pallet from the plane of said conveyor, a support means for supporting said load retaining means and said load in a tilted position, means actuated by said load supporting means at said tilted position for disconnecting said frame from said load retaining means and returning said frame and the empty said first pallet to the plane of said conveyor, means actuated by the said returned frame for displacing the empty said first pallet from said frame and replacing it with an empty second pallet, means actuated by the empty said second pallet on said frame for tilting said frame and said second pallet into engagement with the tilted said load and said load retaining means, means actuated by the tilted said frame with said second pallet thereon for connecting said load retaining means with said frame and for returning as a unit said frame said second pallet with the load thereon and said load retaining means from said tilted position to place said frame in the plane of said conveyor, and means actuated by the returned said frame with said loaded second pallet thereon for disconnecting said load retaining means from said frame and for moving said loaded second pallet from said frame along said conveyor.

9. An automatically operated material handling system in accordance with claim 8, including a first adjustable means carried by said load retaining means and actuated by the loaded said first pallet on said frame to engage the top of said load, and a second adjustable means carried by said load retaining means and actuated by the loaded said first pallet on said frame to engage that side of said load adjacent to the pivot axis of said load retaining means.

References Cited in the file of this patent

UNITED STATES PATENTS

| | | |
|---|---|---|
| 2,520,252 | Mutchler | Aug. 29, 1950 |
| 3,071,258 | Seigh et al. | Jan. 1, 1963 |